United States Patent [19]

Gray

[11] Patent Number: 4,912,850

[45] Date of Patent: Apr. 3, 1990

[54] METHOD FOR MAKING DECORATIVE ARTICLES

[76] Inventor: Juanita Gray, 1258 Dallas St., No. 301, Aurora, Colo. 80010

[21] Appl. No.: 230,514

[22] Filed: Aug. 10, 1988

[51] Int. Cl.$^4$ .......................... G09B 29/00; A41H 3/00
[52] U.S. Cl. ...................................... 33/1 G; 33/17 R; 434/96
[58] Field of Search ...................... 434/81, 95, 96, 97, 434/74; 33/562, 565, 566, 1 G, 17 R

[56] References Cited

U.S. PATENT DOCUMENTS

| | | | |
|---|---|---|---|
| 1,475,112 | 11/1923 | Grimes et al. | 434/96 |
| 3,002,309 | 10/1961 | Snyder | 434/96 X |
| 4,053,986 | 10/1977 | Axelrod | 112/266.1 X |
| 4,398,890 | 8/1983 | Knowlton | 434/96 X |
| 4,646,666 | 3/1987 | Burrier | 112/266.1 |

FOREIGN PATENT DOCUMENTS 189876 2/1922 United Kingdom .................. 434/96

Primary Examiner—Harry N. Haroian
Attorney, Agent, or Firm—Charles C. Corbin

[57] ABSTRACT

A method is disclosed by which an article of art comprising a mosaic-like pictorial design may be made. The pictorial design comprises an arrangement of a plurality of flat, colored pieces of material, with each piece having the configuration of a square, a triangle or a rectangle. The pieces are pictorially arranged by visually following a separate, mosaic-like pattern of numerically color-coded shapes which lie on a grid pattern of intersecting transverse and longitudinal lines which form rows of equal-sized squares and wherein the coded shapes are square, with the size of a grid square, triangular, and rectangular; the triangular shape formed by diagonally bisecting a square, and each rectangular shape by bisecting a square with a line parallel to a transverse or longitudinal line.

9 Claims, 1 Drawing Sheet

METHOD FOR MAKING DECORATIVE ARTICLES

BACKGROUND

The present invention relates generally to an easy-to-follow method for preparing mosaic-like pictures.

There has been made available a good number of arts and craft kits designed to bring the enjoyment of making decorative designs and pictures to both the artistically skilled and unskilled. There however remains a need to provide an easy-to-follow, and highly efficient method that allows one to readily construct mosaic-like pictures using a variety of materials.

SUMMARY OF INVENTION

Thus it is a principle of the present invention to provide such a method and it is more particularly aimed to provide a method which lends itself to use on sewn articles such as quilt blankets and fabric wall hangings, as well as incorporation in rigid articles such as floor and wall tiles, and stained glass.

It is another object of the invention to provide a method for making mosaic-like pictorial designs with a plurality of colored pieces which have a limited number of different shapes.

Still another object of the present invention is to provide a picture-creation method that uses a visual pattern based on a grid-line system, thus allowing a selected mosaic-like design to be recreated in any desired size.

A still further object is to provide for the construction of a mosaic-like design using flat colored pieces of material, with each piece having a square, triangular or rectangular shape.

Accordingly the present invention provides a method for constructing a mosaic-like picture that comprises a prescribed arrangement of colored, uniformly-sized square, triangular, and rectangular pieces of material. Regarding the use of only standardized, regular shaped pieces, it is to be appreciated that this greatly contributes to the efficiency of the present method. The method is carried out by assembling the colored pieces according to a mosaic-like visual pattern of numerically coded square, triangular and rectangular shapes, with the coded pattern having a grid of intersecting longitudinal and transverse lines which intersect to form rows of equal-sized squares. A different code number represents a different color. Each coded square shape on the pattern has the configuration of a grid square, each coded triangular shape is formed by bisecting a square, add each rectangular shape has the configuration of a square that is bisected with a line parallel to a longitudinal or transverse grid line. The inventive method includes the step of first determining, in view of the coded pattern, the number of pieces to be fabricated and their shapes and colors. After preparing the pieces they are arranged in an array of rows corresponding to the array of rows of coded shapes on the pattern. The arranged pieces, thusly arranged to give a pictorial display, are then affixed in place by sewing, bonding or other means.

DETAILED DESCRIPTION

Figure 1:
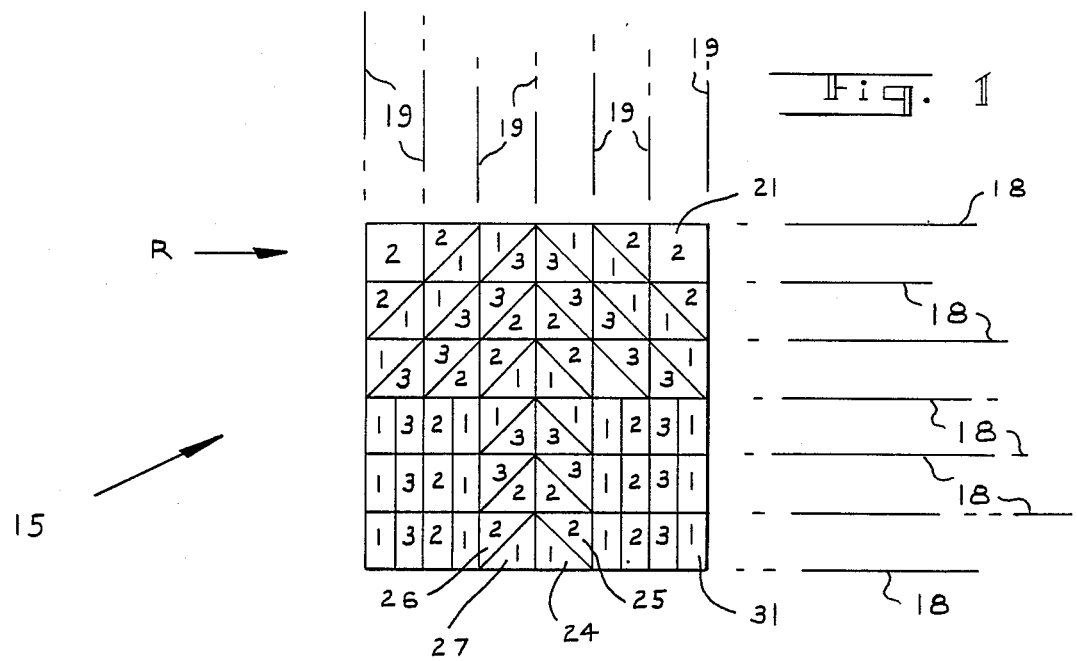
FIG. 1 is a plan view of a typical numerically coded pattern for use with the method of the invention.
Figure 2:
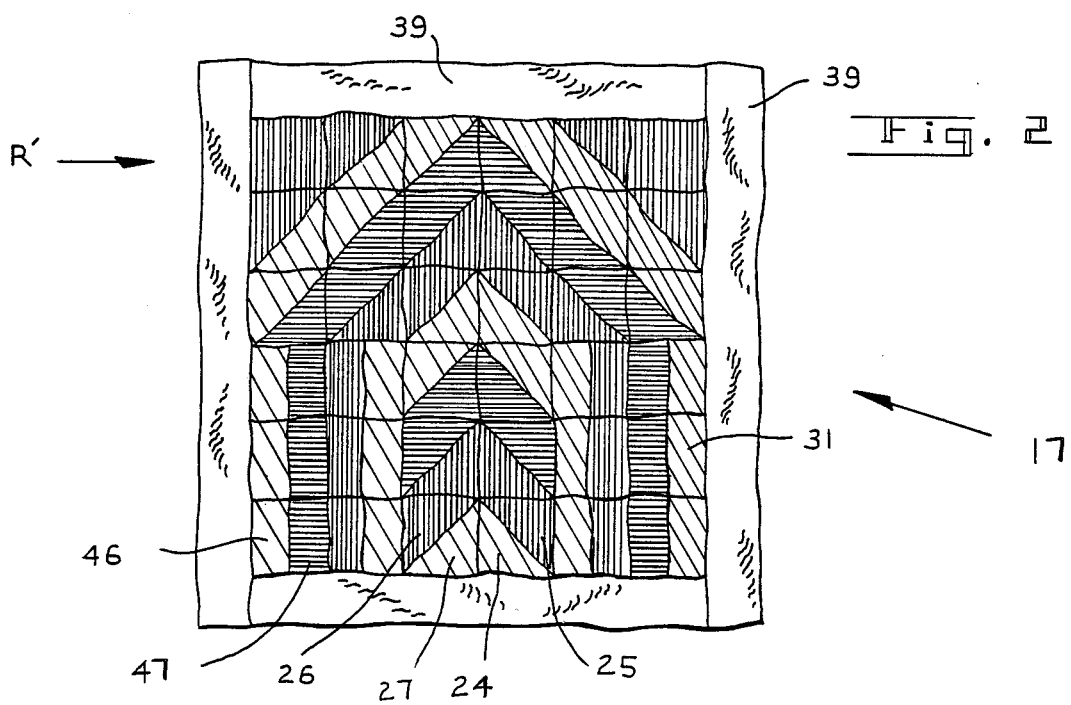
FIG. 2 is a plan view of an article of art constructed according to the invention with the aid of the coded pattern shown in FIG. 1.

Referring now to the drawings, FIG. 1 illustrates a typical code-board 15 for use with the method of the invention, and FIG. 2 shows a mosaic-like pictorial and decorative article 17 made of cloth in a manner to Le described hereinafter with the aid of code-board 15.

The board 15 can be viewed as having a grid system superimposed on it, and that system may be described as being formed by the intersection of transverse lines 18 and longitudinal lines 19, which produce an array of equal-sized squares, arranged in tiers of rows. In the example here shown there are rows six squares across, arranged in six tiers.

A square, triangular or rectangular shape can be made upon any of the aforedescribed grid-squares, and the original pattern creator will have artistically prescribed selected ones of either shape to locations on the grid system so as to form the fundamental layout of the mosaic-like pictorial that will be constructed. A typical square shape is indicated at 21 on the board 15 and it and all square shapes used will coincide with a grid square. The triangular shapes are created by diagonally bisecting a grid-square, and the resulting triangle can have either of the orientations shown by the reference numerals 23, 25, 26 and 27. A typical rectangular pattern board shape is shown at 31. By bisecting a grid-square with a horizontal dividing line, a rectangular pattern board shape (not shown) that is elongated horizontally is provided. The pattern originator has also assigned a color-code numeral to each of the shapes provided on pattern-board 15. In the example shown, the three different numerals 1, 2 and 3 are used to indicate that three contrasting colors will be required in the finished article. It is noteworthy that under the method of this invention the user may choose the different colors to be used, or he or she may follow a color scheme suggested by the original pattern maker (and kit supplier). It should also be appreciated that the invention does not restrict the numbers of rows and tiers that comprise the coded pattern, nor the variety of colors. Thus under the invention, pattern boards having a relatively few rows and tiers, and few colors, may be provided for the beginner and those less skilled in arts-and-crafts; while a pattern-board of many rows and tiers, and several colors, may be provided for those seeking a higher challenge. It is known that a grid system will facilitate accurate reproduction of a given picture pattern into one having a different scale, thus it will become evident that a gridded pattern board such as board 15, can be used by the inventive method to construct mosaic-like decorative pictures in any size and on a large variety of surfaces. Thus it will become apparent that if desired, the method of the invention can construct large pictorials on walls, ceilings and floors, as well as to construct smaller displays in cloth and stained glass.

Referring now again to the drawings, FIG. 2 shows an example of a decorative article 17 constructed of cloth according to the invention, and based on pattern board 15. Here the article 17 has a mosaic-like pictorial portion which is surrounded by a fabric border 39. By comparing the board 15 with 17 it will be apparent that the article 17 may be seen to have the same number of rows and tiers as does the pattern board 15. It is further noted that the upper row R of finished article 17 may be created by reference to the upper row $R_1$ of the pattern board 15.

In a preferred method of constructing the examplary decorative article 17, all the various rectangular, square and triangular fabric pieces that will comprise the article pictorial, according to the pattern board 15, are cut. The pieces may then be laid out on a flat surface to loosely form the required pictorial.

Next, working with one row at a time, the triangular and rectangular pieces in each row are sewn together to form individual multi-colored square pieces. For example, in the sixth row of article 17 the triangular pieces 26 and 27 are joined to form a square, as are the rectangular pieces 46 and 47. In this manner each row is provided entirely with square pieces.

Next, and again working with one row at a time, the arranged squares of each row, including those made from triangles and rectangles as described above, are sewn to one another. Finally, starting with the first and second rows, adjoining rows are sewn together until the pictorial is completed. To highlight the pictorial, plain border pieces such as borders 39 in FIG. 2, are added.

While the invention has been illustrated and described in the foregoing description, the same is to be considered as illustrative and not restrictive in character. It will be apparent to those skilled in the art that various changes and modifications may be made without departing from the spirit and scope of the invention.

What is claimed is:

1. Method for making decorative and pictorial mosaic-like articles of art using a plurality of regularly shaped planar colored pieces of material, each of said pieces having either the shape of a square, a triangle or a rectangle, with each of said triangular pieces having the configuration of a triangle produced by a diagonal joining two corners of said square piece, and each of said rectangular pieces having the configuration produced by bisecting said square piece, and said method also using a pattern comprising a coded mosaic-like design having superimposed thereon a grid pattern of intersecting transverse and longitudinal lines which create an array of rows of equally sized squares, and said pattern also having superimposed thereon lines that diagonally bisect selected ones of said grid squares to form triangles and which bisect other selected grid squares to form rectangles, and with a color code number being applied to each unbisected squares and to each of said grid triangles and rectangles, said method comprising the steps of:
    (a) determining, in view of said coded pattern, the amount of square, rectangular and triangular pieces of material that will comprise the finished article of art;
    (b) fabricating said determined pieces, said pieces having colors according to said color code numbers;
    (c) arranging said pieces in an array of rows corresponding to said array of rows shown on said pattern; and
    (d) affixing in place said arranged pieces.

2. Method according to claim 1 wherein said arrangement of pieces are affixed to a substrate.

3. Method according to claim 1 wherein each of said arranged pieces is affixed to adjoining ones of said pieces along edges of said pieces.

4. Method according to claim 3 wherein said pieces are comprised of flexible material and which pieces are affixed by stitching.

5. Method according to claim 4 including affixing said stitched pieces to a substrate of sheet material.

6. Method according to claim 2 wherein said pieces are tile.

7. Method according to claim 3 wherein said pieces comprise colored glass.

8. Method according to claim 3 wherein said arranged pieces are affixed according to the steps of:
    (a) affixing to each other said pieces comprising a first row, then affixing to each other the pieces comprising the next adjoining row, and similarly affixing the pieces of each of the succeeding rows that comprise the article of art; and
    (b) finally affixing said first row to said next adjoining row, then said next adjoining row to the next succeeding row, and so on until the article is completed.

9. Method according to claim 8 including an initial step in which said pieces comprising a row that is rectangular and triangular are first affixed to each other to form multicolored squares, so that all rows are composed of unaffixed square pieces, which square pieces comprising a first row are affixed to each other, then the square pieces comprising the next adjoining row are affixed to each other, and so on for all rows comprising said article.

* * * * *